UNITED STATES PATENT OFFICE.

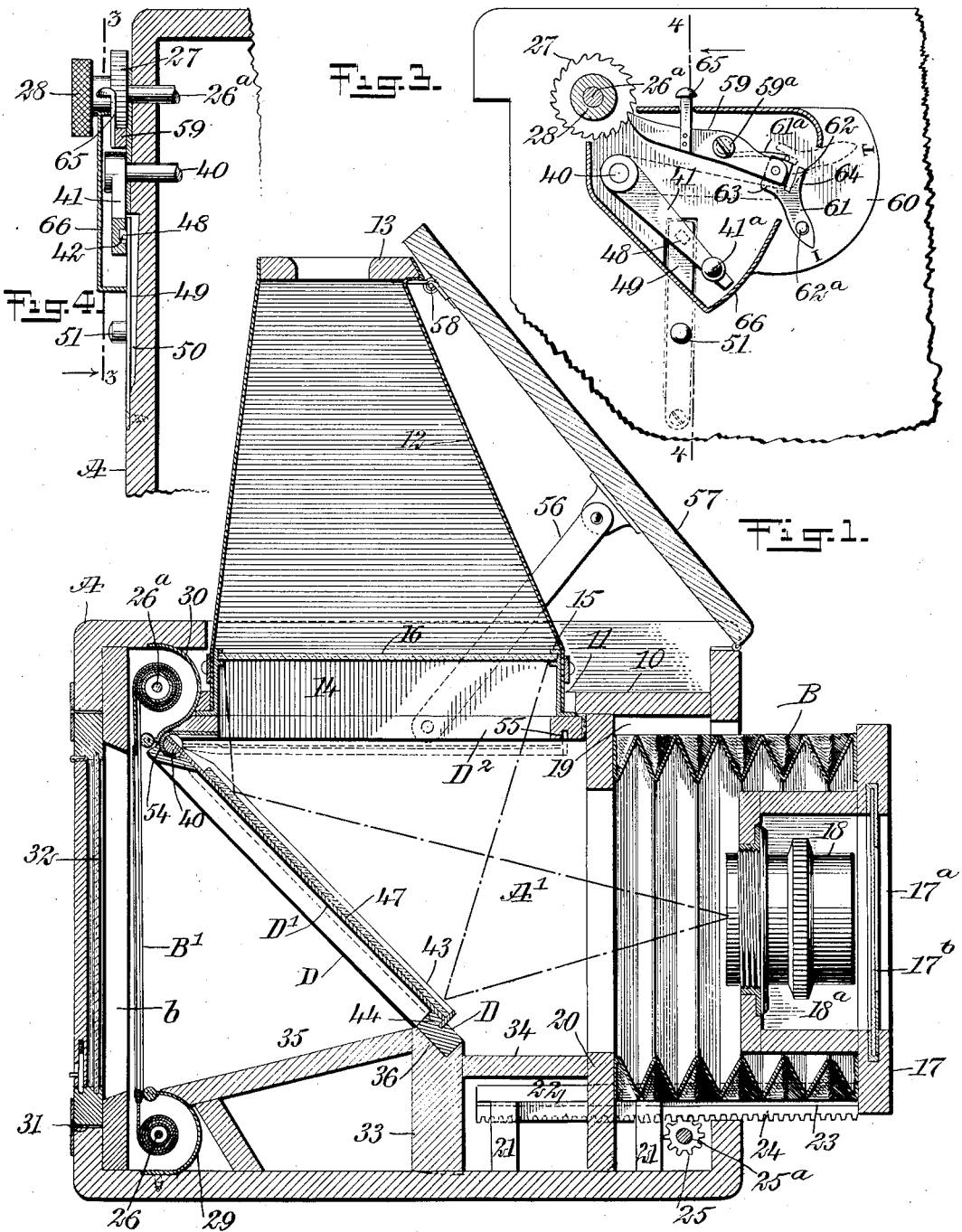

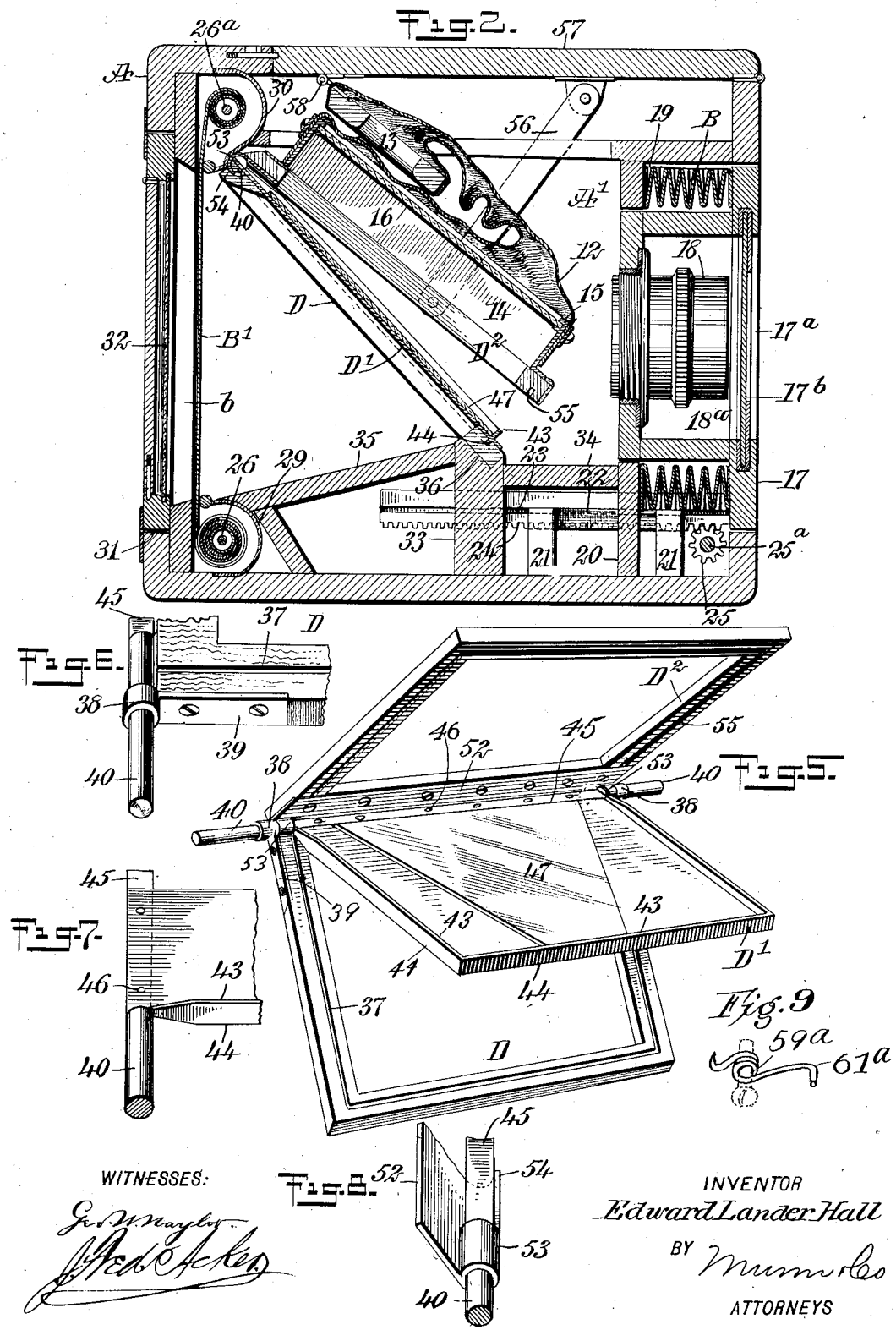

EDWARD LANDER HALL, OF NEW YORK, N. Y.

CAMERA.

No. 859,655.  Specification of Letters Patent.  Patented July 9, 1907.

Application filed March 16, 1906. Serial No. 306,322.

*To all whom it may concern:*

Be it known that I, EDWARD LANDER HALL, a citizen of the United States, and a resident of the city of New York, borough of Manhattan, in the county and State of New York, have invented a new and Improved Camera, of which the following is a full, clear, and exact description.

The purpose of the invention is to provide a construction of camera wherein the focusing mirror is rigidly secured to a tension-controlled shaft, said shaft being mounted to turn in the frame against which the mirror has bearing when in focusing position, and to provide a second frame loosely mounted upon said shaft, adapted to carry the ground glass and focusing hood, the bearings for the latter or hood frame being so controlled as to render the two frames, mirror and shaft perfectly light-tight at their points of connection under all positions of the hood frame and the mirror.

A further purpose of the invention is to provide an externally located and protected mechanism for automatically or manually tripping or releasing the shutter and for operating the focusing mirror, which mechanism is simple, durable, readily understood and operated, and equally well adapted for time or for instantaneous work.

Another purpose of the invention is to provide a simple yet effective means for guiding and supporting the focusing rack for the bellows section of the camera.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a longitudinal vertical section through a camera having the improvement applied, the camera box being open and the parts in position for focusing; Fig. 2 is a view similar to that shown in Fig. 1, with the exception that the bellows section is folded in the box and the cover is closed; Fig. 3 is a sectional side elevation of the mechanism for releasing the shutter and operating the focusing mirror, the section being taken practically on the line 3—3 of Fig. 4; Fig. 4 is a vertical section taken substantially on the line 4—4 of Fig. 3; Fig. 5 is a perspective view of the focusing mirror, its bearing frame and hood frame and the shaft of the focusing mirror with which the frames have loose connection; Fig. 6 is a perspective view of a portion of the bearing frame, showing its relation to the shaft of the focusing mirror; Fig. 7 is a perspective view of a portion of the mirror frame, illustrating its connection with the said shaft; Fig. 8 is a perspective view of a portion of the mirror controlling shaft and a bearing for the hood frame through which the shaft passes, together with a portion of a light shield, forming a part of the said frame or its bearings, and Fig. 9 is a detail view of a spring employed in connection with the exposure-controlling mechanism of the camera.

A represents a camera box which is provided with a well A', above which well the customary buffer board 10 is located, and in said board an opening 11 is made, usually rectangular in contour, through which passes the focusing hood 12, provided at its upper end with a proper eye-piece 13. The lower end of the focusing hood 12 is secured to a frame 14 of a stiff material, which frame corresponds in contour to the contour of the opening 11, and is adapted to readily pass through said opening. This base frame 14 for the focusing hood 12 has channels 15 formed therein to accommodate the ground glass 16, which ground glass is located at the upper portion of the base frame 14, as is shown in Figs. 1 and 2.

B represents the bellows section of the camera, provided with the customary front board 17, and 18 represents the lens which is set back from the front board 17 in a well 18$^a$, and the opening 17$^a$ in the front board opposite the well is opened or closed through the medium of a shutter or a door 17$^b$, or any equivalent device. When the camera is closed the bellows section B is folded up in a chamber 19 within the box, as is shown in Fig. 2, separated from the well A' by a partition 20 having a suitable opening therein for the passage of rays of light to the rear of the camera box.

Adjacent to each side of the camera box at its forward portion, blocks 21 are secured, and the blocks at each side serve to support an L-shaped track 22, and the horizontal members of these tracks 22 enter longitudinal grooves 23 in the racks 24, which racks are secured in any approved manner to the bellows section B as is indicated in Figs. 1 and 2. The teeth of the racks 24 are engaged by pinions 25, which pinions are mounted on a spindle 25$^a$, operated from the exterior of the camera.

B represents a curtain shutter, passing as usual over a rear opening $b$ provided in the camera box, and said shutter is provided with the usual lower tension shaft 26 and upper winding shaft 26$^a$. At the right-hand end of the winding shaft 26$^a$, outside of the camera box, a ratchet wheel 27 is secured, and also a thumb nut 28, whereby to conveniently turn the winding shaft 26$^a$. That portion of the curtain which is immediately controlled by the tension shaft 26 is protected by a guard or shield 29, located forwardly of the said shaft, and the winding shaft 26$^a$ is similarly protected by a shield or guard 30, so as to render the well A' as light-tight as possible.

The rear portion of the camera box is provided with an opening 31, which contains any approved mechanism for holding the plate or film holder 32 in position for exposure of the plate or the film contained therein. In the detail construction of the box, as illustrated, a partition 33 extends from side to side at the bottom forward portion of the well A', but said partition does not extend within the range of the lens 18; and this partition 33 is shown connected with the partition 20 by a board 34 horizontally disposed. The partition 33 is also shown connected with a rear board 35, extending downward to the lower guard or shield 29. Both these boards 34 and 35 extend from side to side of the camera box, and in the upper edge of the vertical partition 33 an inclined recess 36 is made, the inclination of said recess being downward and forward. This recess receives the lower end of what I term a supporting frame D. This frame inclines upward and rearward from the partition 33 to a point adjacent to the upper portion of the curtain B', and to the rear of and yet below the rear end of the buffer board 10, as is shown in Figs. 1 and 2. This supporting frame D is provided with a groove 37 in its upper face, extending longitudinally of its sides and of its lower end portion, as is clearly shown in Fig. 5. The supporting frame D is provided at its upper side portions with bearings 38, usually attached to the sides of the frame through the medium of straps 39, as is shown in Fig. 6. A shaft 40 is passed through the said bearings 38, and is likewise journaled in the sides of the box A. The shaft 40 extends out beyond the side of the box at which the winding shaft $26^a$ extends, as is shown in Figs. 3 and 4. At the outer end of this shaft 40 a crank arm 41 is secured, whereby to turn the shaft from the exterior of the camera box, and this crank arm is provided at a suitable point in its length at its inner face with a recess or aperture 42, as is clearly shown in Fig. 4.

The shaft 40 is adapted to control a focusing mirror, and therefore may be denominated the mirror shaft. To that end a tray D' is provided, of the same shape as the supporting frame D, namely, rectangular, and this tray has upper flanges 43 and lower flanges 44 at its side and bottom or forward marginal portions. The mirror shaft 40, has its upper surface flattened between its ends, as is shown particularly at 45 in Figs. 6, 7 and 8; and the rear edge portion of the said tray D' is secured to this flattened portion 45 of the shaft 40 by means of rivets 46, or in any suitable or approved manner.

A focusing mirror 47 is secured in any suitable or approved manner on the upper face of the tray D', the upper flanges 43 of the tray extending beyond the said mirror; and a spring $47^a$ is employed in connection with the shaft 40 to so act as to normally force the mirror and its tray D' upward to a horizontal position, shown by dotted lines in Fig. 1. The mirror and its tray D' are brought to the engagement mentioned with the supporting frame D, by turning the crank arm 41 downward to the position shown in Fig. 3, thus causing the lug 48 of a spring tongue 49 to enter the recess 42 in the arm 41 and hold the arm in its lower position, and consequently the mirror tray in engagement with its supporting frame D. The tongue 49 is secured at its lower end to the outside of the camera box opposite a recess 50 therein, and is provided with an external button 51; and by pressing the said button inward the arm 41 is released and the spring $47^a$ will then immediately act to throw the focusing mirror with its accompanying tray D' from its focusing or lower position to the aforesaid upper position, shown by dotted lines in Fig. 1, causing the mirror and its tray at such time to completely close all communication between the well A' and the focusing hood 12.

The mirror shaft 40 carries likewise an upper frame $D^2$, and this frame is attached at its upper portion to the base frame 14 of the focusing hood 12; and when the hood is elevated for focusing, this frame $D^2$ engages with the under face of the buffer board 10, adjacent to the opening 11 therein, as is shown by full lines in Fig. 1, thus insuring the ground glass 16 and the hood 12 assuming their proper position for use.

A plate 52 is preferably secured to the inner face of the frame $D^2$ for the focusing hood at the lower member of said frame, as is shown best in Fig. 5, and this plate is provided at each end with a bearing 53, through which the shaft 40 is loosely passed; and these bearings 53 occupy a position on the shaft adjacent to the inner ends of the bearings 38 on the supporting frame D. The bearing plate 52 is also provided between the bearings 53 with a segmental section 54, which curves around the shaft 40 as is shown particularly in Figs. 1, 2 and 8, and this acts as a guard or light shield, preventing any light gaining access from the back of the mirror tray and the frames D and D' when focusing is to take place, and likewise preventing any light gaining access to the well when the mirror and the upper frame $D^2$ are in their upper positions for exposure of the plate. The upper or hood-carrying frame $D^2$ is provided with grooves 55 in its under face, extending along its side and its forward members, which grooves are adapted to receive the upper flanges 43 of the mirror tray D', whenever the mirror tray and the hood-supporting frame are brought in engagement.

The camera box A is provided with a cover 57 hinged thereto, and links 56 are pivoted to the said cover and to the upper frame $D^2$, and the upper end of the focusing hood 12 preferably at the eye-piece 13, is connected with the said cover by one or more hinges 58; so that when the cover is opened it carries up with it the focusing hood and the frame D to which it is attached, bringing the same into focusing position, and either before or after such action the focusing mirror and its tray D' may be carried down to an engagement with the supporting frame D.

A dog 59 is pivoted by means of a pin $59^a$ passed through its central portion on a dial plate 60 secured to the exterior of the camera box adjacent to the winding shaft $26^a$, as is shown in Fig. 3, which dial plate at its outer edge is marked for prolonged and for instantaneous exposure, the letter T designating the prolongation of time and the letter I being employed to designate instantaneous exposure.

A pointer 61 has its head portion which is rectangular, pivotally connected with the outer end of the dog 59, and a spring $61^a$ attached to the pin $59^a$, is carried outward to an engagement with the head of the pointer 61, and to an engagement with the upper edge of the dog 59, so as to normally keep the inner end of the said dog in engagement with the teeth of the ratchet wheel 27 on the winding shaft $26^a$. This pointer is movable to and from the aforesaid letters T and I, and is provided with a slot 62, in what may be termed its upper portion, the said slot being in an upper position when the pointer 61 is opposite the letter I indicating instantaneous exposure, and at such time also, a nose 63, which is a continuation of the head of the pointer, will extend below the lower edge of the dog 59, as shown by full lines in Fig. 3. When the pointer is in this position, indicating instantaneous work, and an exposure is to be made, focusing having been accomplished, the button 51 is pressed inward, thus releasing the arm 41 of the mirror shaft 40, and by means of the spring 47ᵃ the said shaft is turned to bring the mirror to its upper position shown by dotted lines in Fig. 1, and as the mirror is carried upward the free end portion of the arm 41 will engage with the nose 63 of the pointer 61 and will force the outer end of the dog 59 upward, thus causing the inner end of the dog to be carried from the ratchet wheel 27, permitting the shutter to act.

When prolonged exposure is required, the focal plane shutter is adjusted to bring its largest opening opposite the lens and the mirror is also carried to focusing position. The pointer 61 is then carried to the letter T on the dial 60, and the spring 61 will be received in the slot 62 in the head of the pointer, thus preventing said pointer from being jarred horizontally from its upper position, and at such time the nose 63 of the pointer will have been carried from beneath the lower edge of the dog. When the knob 51 is pressed the arm 41 is released to carry the mirror upward, and said arm at this time will not strike the dog to release the same, but the exposure of the plate will be effected at such time, and such exposure will be continued until the button 65 is pressed downward, whereby to release the shutter-operating mechanism to bring the blank portion of the shutter over the plate.

A casing 66 is provided for the arm 41, the dog 59 and the head portion of its accompanying pointer 61, so as to protect these parts; and the arm 41 is provided with a knob 41ᵃ, which extends out through an arcuate slot in said casing, while the button 65 extends out through an opening in the upper portion of the casing. A knob 62ᵃ is also provided for the pointer 61, so that the latter can be conveniently moved.

Having thus described my invention, I claim as new and desire to secure by Letters Patent:

1. In a camera, a spring-controlled shaft, means for moving the shaft against the tension of the spring, a mirror secured to the shaft, a supporting frame independent of the mirror and below the same, having a loose connection with the shaft, a frame located above the mirror and a focusing hood for the frame, the frame being loosely mounted on the shaft.

2. In a camera, a spring-controlled shaft, means for moving the shaft against the tension of the spring, a mirror secured to the shaft, a supporting frame independent of the mirror and below the same, and having a loose connection with the shaft, a frame located above the mirror a focusing hood for the frame, the frame being loosely mounted on the shaft, and a light shield extending from one of the said frames partially around the said shaft at its rear, whereby to exclude light where the frame and the mirror engage with the shaft.

3. In a camera, a spring-controlled shaft, a tray secured to the shaft between its ends, having upper and lower flanges at its side and forward edges, a focusing mirror supported on the upper face of the tray, a supporting frame for the tray of the focusing mirror, having bearings through which the shaft loosely passes and being provided with grooves in its upper face to receive the lower flanges of the said tray, a second frame located above the focusing mirror and its tray, having grooves in its under face to receive the upper flanges of the tray of the focusing mirror a focusing hood for the said second frame, bearings attached to the said upper frame through which the shaft loosely passes, and a light shield extending from end to end of the upper frame, being curved around the said shaft.

4. In a camera, the combination with a spring-controlled shaft mounted in the camera box, means for externally operating the said shaft against the tension of the spring, the said shaft being flattened at its upper face between its ends, a tray secured to the flattened surface of the shaft, having upper and lower side and forward flanges, a focusing mirror secured to the upper surface of the tray, a frame adapted as a support for the mirror tray when the mirror is in focusing position, which supporting frame is provided with bearings through which the shaft loosely passes, and with recesses in its upper face to receive the lower flanges of the mirror tray, a second frame located above the said mirror tray, the said upper frame being provided with bearings through which the shaft loosely passes a focusing hood for the upper frame, and a segmental light shield forming continuations of the bearings and extending partially around the said shaft.

5. In a camera, a winding roll for a shutter and its ratchet wheel, a dial plate, a spring-controlled dog pivoted on the dial plate, engaging with the teeth of the ratchet wheel, means for manually disengaging the said dog from the ratchet teeth, and a pointer pivotally carried at the outer end of the dog and movable over the said dial.

6. In a camera, the combination with the winding shaft of a shutter, the ratchet wheel thereon and a dial secured adjacent to the ratchet wheel, and marked for time and for instantaneous exposure, a dog pivoted on said dial, arranged for engagement with the teeth of the ratchet wheel, a spring normally holding the dog in such engagement, means for forcing the dog out of engagement with the said ratchet wheel, a pointer having a head provided with a slot, which head is pivoted to the outer end portion of the dog, the pointer in its lowest position indicating instantaneous exposure and in its highest position indicating time, in which latter position the spring controlling the dog enters the slot of the pointer and exerts binding tension thereon.

7. In a camera, the combination with the winding shaft of a curtain and its ratchet wheel, a dial plate adjacent to the ratchet wheel marked for time and for instantaneous exposure, a dog pivoted on said plate, for engagement with the ratchet wheel, a spring exerting downward tension upon the said dog, means for manually carrying the dog from the ratchet wheel, and a pointer pivoted to the outer end of the ratchet wheel at its head portion, which head is provided with a nose that extends beneath the lower edge of the dog when the pointer is in its lower position, and being also provided with a slot that receives an end of the spring when the pointer is in its upper position, in which latter position the nose is carried from beneath the dog, of a spring-controlled mirror shaft, a crank arm secured to the outer end of the said shaft and located beneath the said dog, a spring button secured at a point adjacent to the said arm, and a locking connection between the said button and the arm, whereby to hold the mirror on the mirror shaft in focusing position, the said arm when released from the button engaging with the nose of the said pointer when the said pointer is in its lowest position to automatically release the dog from the ratchet wheel.

In testimony whereof I have signed my name to this specification in the presence of two subscribing witnesses.

EDWARD LANDER HALL.

Witnesses:
JNO. M. RITTER,
J. FRED. ACKER.